United States Patent Office

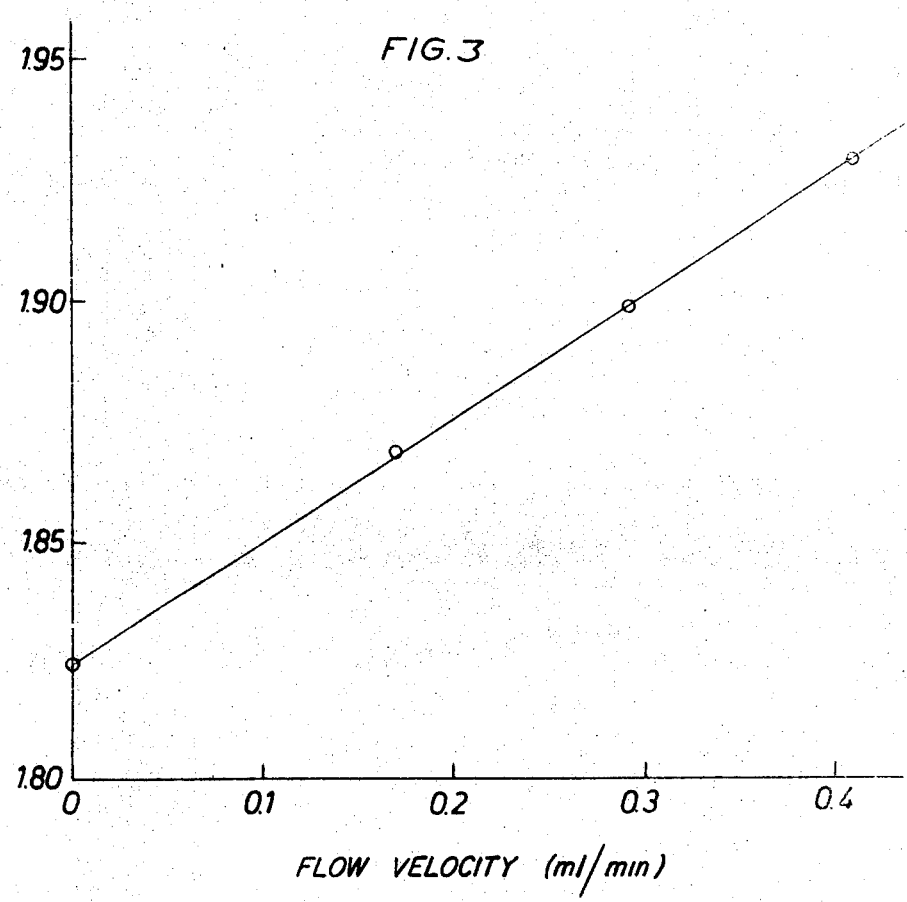

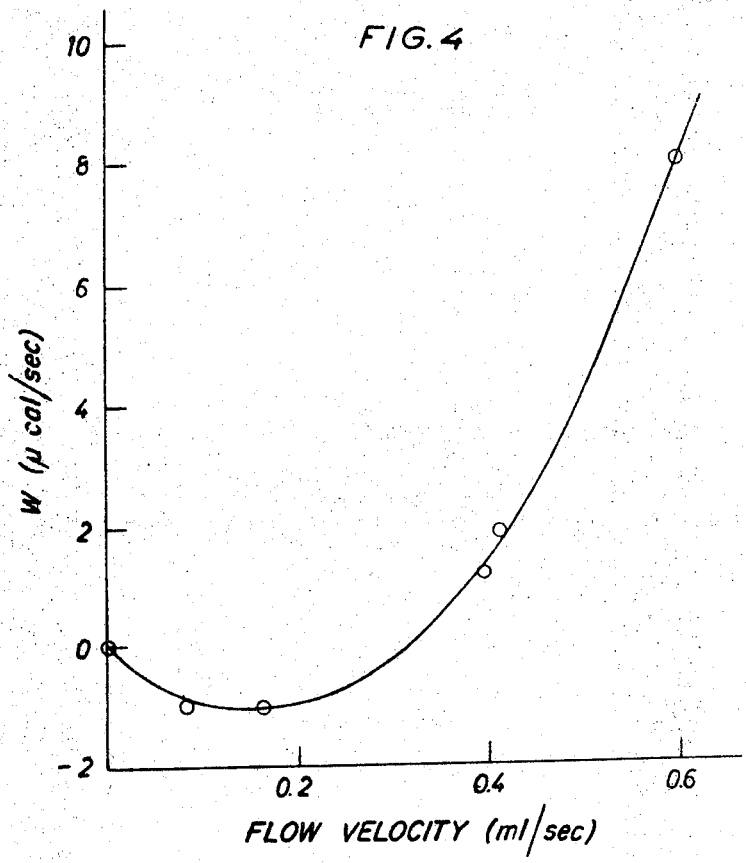

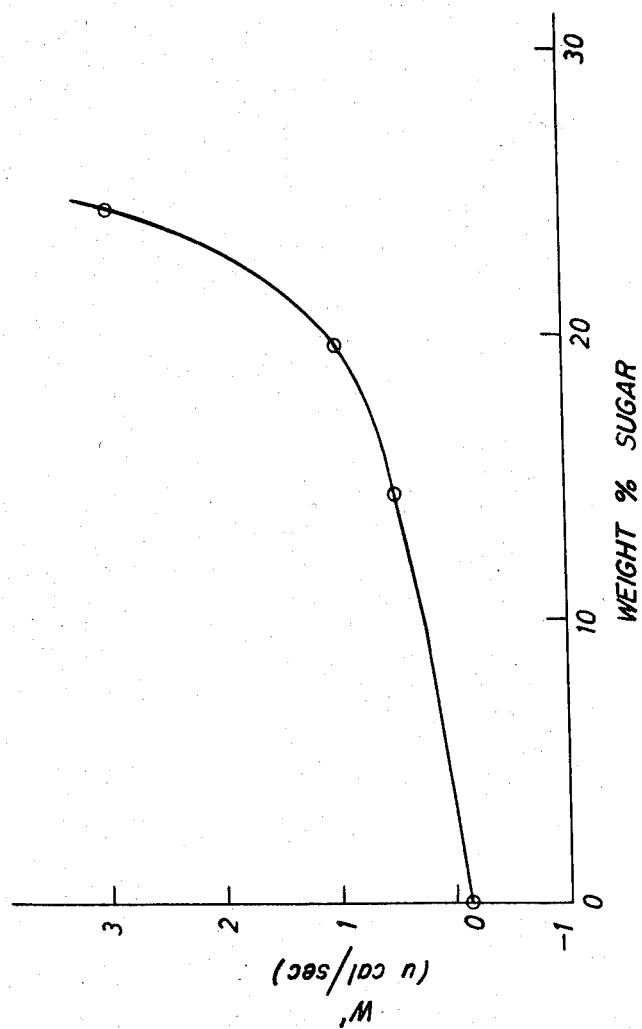

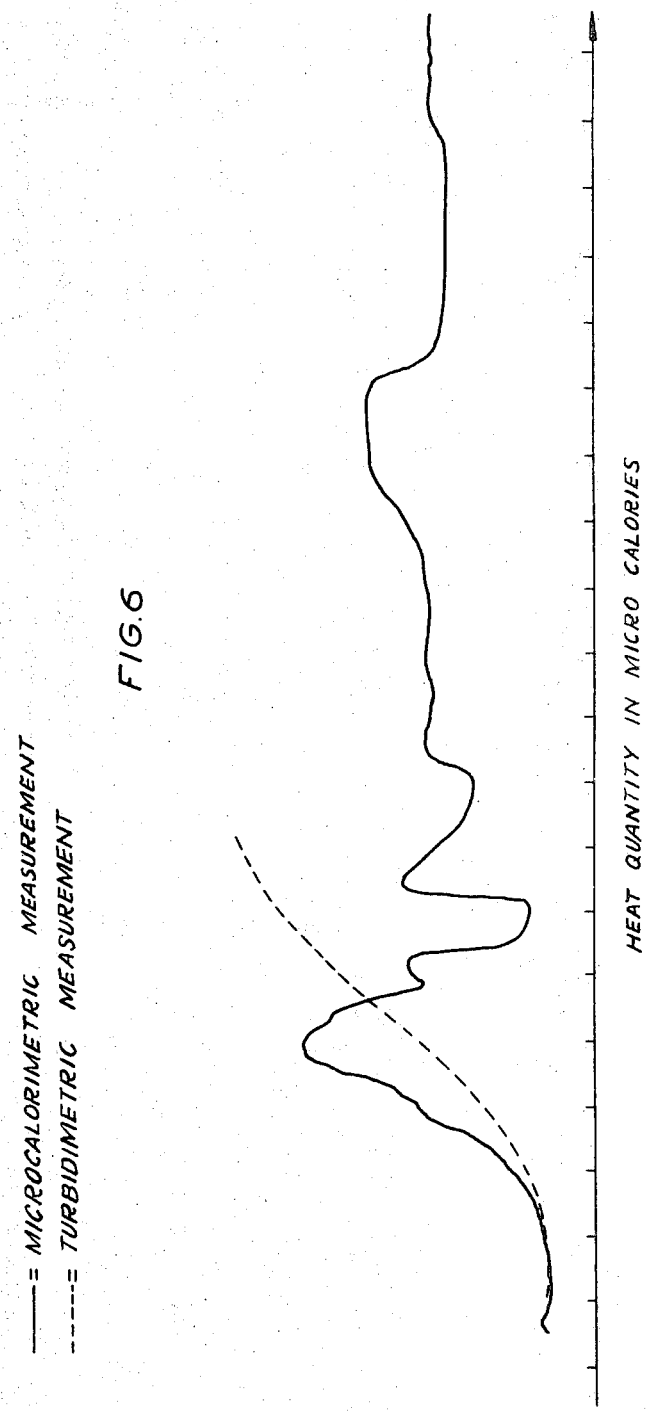

3,552,207
Patented Jan. 5, 1971

3,552,207
METHODS AND APPARATUS FOR CONTINUOUSLY ANALYSING LIQUIDS BY MICROCALORIMETRIC MEASUREMENT OF THE THERMAL FLOW OF THE LIQUID
Paul Robin Monk, Lockleys, Adelaide, South Australia, Australia, and Bertil Ingemar Wadsö, Lund, Sweden, assignors to LKB-Produkter AB, Mariehall, Sweden
Filed Mar. 18, 1969, Ser. No. 808,170
Claims priority, application Sweden, Mar. 20, 1968, 3,662/68
Int. Cl. G01k 17/10; G01n 25/20
U.S. Cl. 73—190                                                    18 Claims

ABSTRACT OF THE DISCLOSURE

A method for continuously analyzing liquids by microcalorimetric measurement wherein the liquid is caused to flow through a heat exchanger arranged in heat equilibrium with a pair of thermopiles. The heat-equalized liquid is then caused to flow through an elongated channel in a measuring cell in thermal contact with one of the thermopiles. Voltage charges due to chemical and physical processes as the liquid passes through the cell are then measured.

---

This invention relates to a method and an apparatus for continuously analysing liquids by microcalorimetric measurement of the thermal flow of the liquid with or without addition of a liquid reaction component to the liquid in question; the liquid quantity flowing through the measuring apparatus can be very small, for instance from some millilitres to individual droplets of the liquid or the different liquids to be analysed. It is previously known to perform microcalorimetric analyses on liquids with the use of batchwise supplied measuring containers or vessels which on at least two sides or on all sides are surrounded by thermopiles which in turn are in good heat conductive contact with a heat dissipating body. For an improved exactitude of the measured values it is customary to provide within the same body an equilibration unit of the same design as that in the measuring vessel, however without such vessel, the two groups of thermopiles being counterconnected. This so-called twin-arrangement calorimetry will equilibrate possible temperature fluctuations in the heat dissipating body or heat sink.

Calorimetry has been used for a very long time (150 years) as a method of studying reactions of various kinds. Although it is the question of a principle well known to any and all the studies have been effected only on a batch scale, the so-called batch microcalorimetry being the most advanced form of detecting heat quantities in the microcalorimetry field. The principles of a batch microcalorimeter have been described in more detail by Wadsö in an article in Acta Chemica Scandinavica, 22 (1968) 927–937.

Flow microcalorimetry is something entirely novel and has not occurred earlier. It may seem obvious to construct a flow calorimeter when the principles of calorimetry and the cells used as optical measurements are known. This does not, however, seem to be the case since calorimetry is 150 years old and flow cells have surely existed for 20 years.

The development of flow calorimeters according to the present invention has made it possible to effect interesting studies of biological material. Bacteriologists have long wished for possibilities to examine the life processes of bacteria. For many years attempts have been made with photometers and turbidity-measuring devices. The curves obtained convey very little information to the researcher.

This method in which the reaction heat is measured during rapid dissipation thereof via a thermopile to a heat dissipating body, that is under constant temperature conditions compensated for by the twin-arrangement and under registration of the thermal flow in relation to time, entirely differs in point of principles from the methods in which the temperatures of the reaction components are read separately and the temperature of the reaction mixture is then measured for determining for example the completion of a neutralization procedure. Such methods are thus based upon measurement of temperature differences and not upon measurement of thermal flow for a certain time and registration of said thermal flow as a function of time.

According to the microcalorimetric method, cycles can be followed with or without addition of a second reaction component, for instance biochemical cycles such as fermentation processes.

The present invention now suggests a method of continuously analysing process liquids by the microcalorimetric measuring method with the use of a flow cell which is suited for measurement and registration of internal reaction processes, such as biochemical processes, without addition of a reaction component, as well as for reactions in which a second component is added. In the latter case a considerable complication is involved, namely the formation of a homogeneous mixture in the measuring vessel within the time interval during which the liquid flows through the vessel.

Already in batch measurements there arise difficulties in obtaining a homogeneous mixture, and for this reason a plurality of two-chamber measuring vessels have been suggested. The liquids which have been equilibrated to the same temperature are brought together in such a vessel for instance by rotation thereof, and int. al. air is utilized to ensure a rapid and homogeneous mixture of the two reaction components (as has been suggested for instance by the inventor in an earlier work). In this procedure one thus exploits the difference in density between air and liquid to agitate and mix the components. In flow measuring cells according to the present invention, however, quite other problems are involved. Already single air bubbles in the measuring cell disturb the mixing and measuring procedure, for which reason such bubbles should be avoided as distinct from the batchwise operating cells. This is attained according to the invention int. al. in that the flow passage through the measuring cell has a small cross section, say 1.5 mm. or preferably less. Such a small cross section should be used irrespectively of whether the liquid to be analysed is mixed or not mixed with a second component. Moreover, the cross sectional area of the flow passage is dependent upon the reaction rate in the measuring cell and to a certain extent also upon the viscosity of the liquid.

The experimental procedure with the batch calorimeter is very simple. Besides, the flow method according to the present invention fundamentally is entirely automatical and does not require any time of equilibration. Therefore the flow method offers considerable advantages, particularly so when the calorimeter is used for extensive series measurements or when it is used as an analysing apparatus for continuous measurement.

The sensitivity expressed as the voltage of the thermopile at a given heat effect is substantially the same in both methods. The batch calorimeter fundamentally is a more sensitive instrument because the heat from a volume of say 5 ml. of calorimetric liquid is generated and measured as a pulse in rapid processes. In the flow version the corresponding heat quantity is developed for a time of say half an hour. The flow method, however, can be made considerably more sensitive, while a corresponding improvement of the batch method does not seem possible.

The batch calorimeter is suited for reactions covering momentary processes to reactions having a durabiilty of several hours. The flow calorimeter on the other hand requires that the heat be generated within the mixing zone, that is the reaction time should be short compared to the time of stay of the liquid in the measuring cell. In the flow cell according to the present invention the time of stay generally is of the order of 5 minutes, and a reaction time of 1 minute or less is therefore well suited for the method. The measuring cell can of course be formed with a longer passage which gives the liquid a longer flow time and time of stay, respectively, in the measuring cell whereby also slow reactions can be followed. In slow reactions it is further possible to stop the flow through the measuring cell for so long a time that the reaction runs to an end. The flow method besides offers great advantages compared to the batch method when studying constant reactions such as enzymatic processes with substrate-saturated enzymes. This is particularly obvious when the calorimeter is utilized as analytical instrument.

These measurements require a flow calorimeter according to the invention. Other methods cannot be used. Batch microcalorimetry has considerable drawbacks compared to flow microcalorimetry and cannot be used.

In batch microcalorimetry it is more difficult to obtain the desired sterilization than in flow systems because the purity requirements are greater in the batch case. Special growth of unfavourable culture can take place if sterile containers are not used. In flow systems this is not realized when the flow is of the order of 1 litre of substance per 24 hours.

With aerobic bacteria oxygen has to be supplied, which is more easily realized in flow calorimeters than in batch calorimeters. In the former case the solution is saturated with oxygen from the beginning, which is, however, more difficult in the latter case as a batch cell contains liquid samples in air environment. Evaporation can take place more readily.

Furthermore, flow systems are more advantageous than batch systems in working with suspensions. The flow eliminates deposits on the bottom of the cell and the associated problems with a uniform supply of nutritives and oxygen.

The flow system is extremely well suited for broadly arranged studies of biological material with successive addition of antibiotics, nutritives, vitamins or the like.

The flow system can also be used directly for process control of continuous or batch processes in chemical production.

Although a great many advantages have been associated for a long time with the use of flow calorimeters no such calorimeters have ever been developed. The development in the flow field has mainly been limited to optical flow cells. Attempts have certainly been made with temperature detecting alone in flow measurement, but this method has obvious disadvantages. Very rapid reactions are required at temperature measurement. When making calorimetric measurement the temperature level is of no interest, the point of interest being the amount of heat delivered. The time of reaction can be relatively long. At present, reactions having a time of reaction of up to 5 minutes can be studied in the flow calorimeter, but still slower reactions can be studied if the flow time is increased. For the rest, it is always possible temporarily to stop the flow.

In examining and measuring a chemical reaction with addition of a liquid solution containing a reaction component for the liquid to be analysed it has proved according to the present invention that an absolutely complete mixture can be attained within the measuring cell by providing said cell with a passage or channel extending for example in zigzag. Besides, in the vicinity of the inlet side for the two liquid components said passage can have one or more constrictions by which the veil formation of the respective liquids in relation to each other is reduced. Mixing of the reaction components may take place, however, also outside the measuring cell.

When two calorimetric liquids are brought together in the mixing zone of the flow cell a constant flow rate will occasion a constant heat effect in the calorimetric cell. If this heat effect is allowed to proceed for a sufficiently long time constant conditions are established, that is the heat generated in the cell per unit of time will be equal to the heat carried away from the cell. To exploit constant conditions constitutes the most exact way of operating the present calorimeter, for which reason this principle will now be discussed in more detail.

A major part of the heat effect (W) generated in the cell will at steady state be transported from the cell by heat conduction through the surrounding thermopile ($W_t$) and to a minor extent will be lost through the air gap between parts of the flow cell surface not in contact with the thermopile. A small fraction of the total heat effect generated will also leave the cell by the liquid flow. It may be expected that for a given calorimeter and for stated values for flow rates, reaction rate and physical properties of the calorimetric liquid the fraction $W_t/W$ will be constant, that is $$W = \alpha \cdot W_t \tag{1}$$

The temperature gradient at various parts of the thermopile is expected to be proportional both to the heat flow and to the voltage generated. Integration over the total thermopile area will lead to the expression $$W_t = \beta \cdot V \tag{2}$$

where $\beta$ is a constant and V is the thermopile voltage. Combination of (1) and (2) will lead to $$W = \alpha \cdot \beta V = \epsilon \cdot V \tag{3}$$

A small fraction of the heat effect generated in the cell is a consequence of the flow of liquid through the cell such as heat of friction etc. The contribution to the thermopile signal from this latter heat effect may be determined at separate zero experiments. If this thermopile value is taken as the reference point for the thermopile voltage at the main experiment then $$W_p = \epsilon \cdot V_p \tag{4}$$

where $W_p$ is the heat effect provided by the process occurring in the flow cell and $V_p$ is the displacement of the thermopile voltage value from the determined baseline. The constant $\epsilon$ can be determined by electrical calibration.

It should also be observed that in the cases where a reaction component is not to be added to the liquid to be analysed and examined, respectively, the flow passage through the measuring cell can be formed as a straight flow passage. In its extreme application an analysing apparatus according to the invention can thus comprise only a flow tube which at one point is surrounded by a thermopile unit which is in good heat dissipating contact with an insulated heat sink and is connected to a measuring instrument. In this apparatus it is sufficient to have a single droplet of the liquid to be analysed. This implies that different liquids having different thermal flows can be advanced successively and spaced a small distance apart through the analysing pipe. It may then be suitable to introduce rinsing liquid between the analysis samples separated by gas bubbles.

According to the invention it is further possible periodically to stop the flow through the measuring apparatus to follow the course of the reaction in a given analysis sample for an extended time, which implies a type of continuous but nevertheless batchwise measurement.

The method and the apparatus suggested by the present invention thus provide the possibility of a great many analysis variations in a continuous process which permits a considerably improved process control within most fields of inorganic and organic chemistry, including and perhaps particularly in biochemistry, including fermentation processes and continuous analysis of successively supplied samples of body liquids.

For these and other purposes the method of the invention is characterised by advancing the liquid through a channel which at the microcalorimetric measuring point without external, thermal disturbance and under good heat dissipation at the measuring point is substantially surrounded by a thermopile connected to an indicating instrument, possibly via an amplifier, for measurement of the thermal flow with respect to time when the liquid flows past the thermopile, the liquid or the mixture of liquids flowing past the measuring point continuously or with intervals of stay in the form of a continuous or discontinuous flow.

The microcalorimetric analysing apparatus according to the invention for carrying out this method is characterised by a flow channel which is connected via at least one conduit to a feed device for conveying at least one liquid through the channel which traverses a measuring cell which in a known manner is enclosed between thermopiles whose sides facing away from the cell bear against material of high heat conductivity and which in turn are enclosed in a jacket of heat-conductive material, and preferably one pair of twin thermopiles are enclosed in the same jacket and counter-connected in relation to the thermopiles of the measuring cell which are adapted to measure the thermal flow from the liquid.

The invention will be more fully described in the following with reference to an embodiment, chosen by way of example, and a modification of the microcalorimetric analysing apparatus.

In the drawings:

FIGS. 3–5 are diagrams taken by means of the apparatus shown in FIGS. 1 and 2, FIG. 3 being an electrical calibration curve, FIG. 4 a diagram showing the variations for the calibration constant at different flow rates, and FIG. 5 the variations in the zero effect with respect to the viscosity of the calorimetric liquid;

FIG. 6 is a diagram showing the life cycle of *Escherichia coli*.

Figure 1:
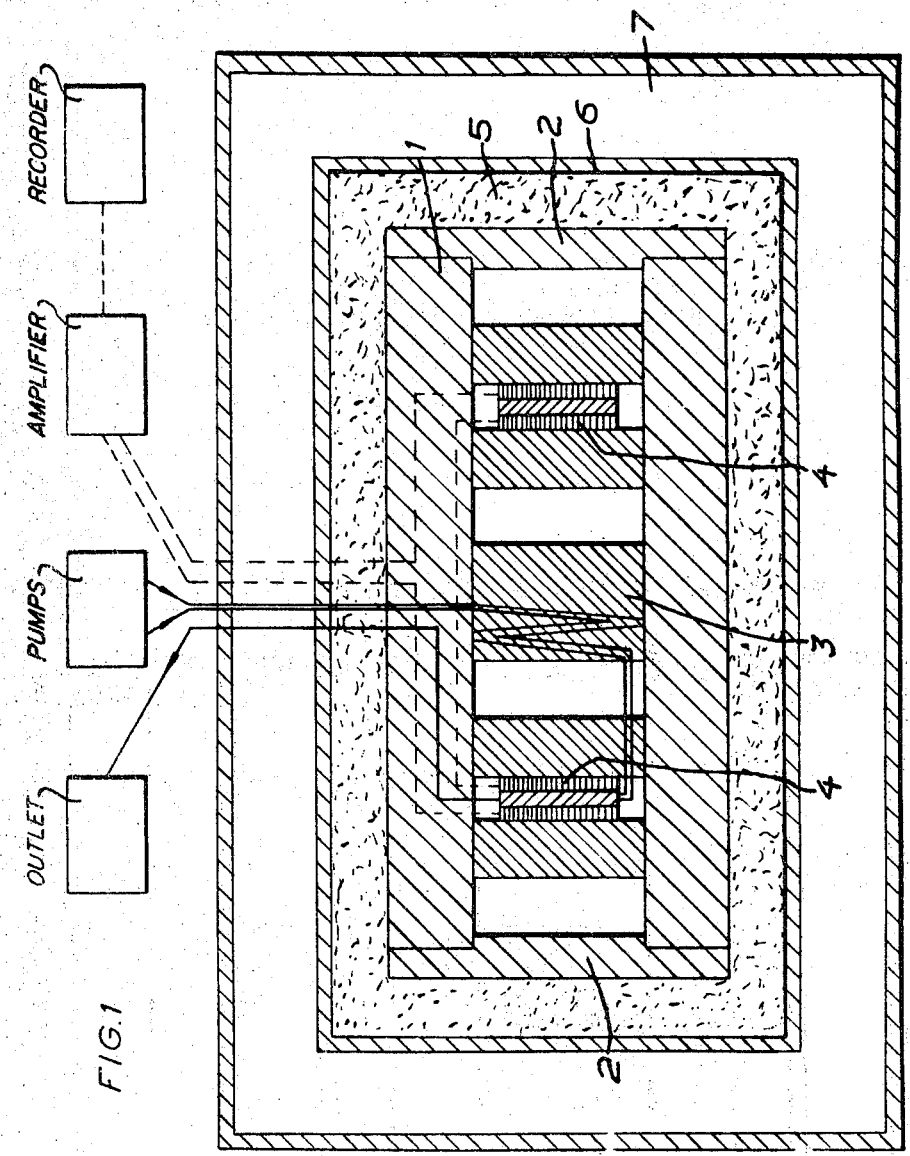
FIG. 1 is a view of the assembled measuring apparatus with the measuring cell thereof enclosed in a heat sink.

The apparatus shown in FIG. 1 comprises a main heat sink 1 which is substantially of the same type as that used for batchwise measurements. It is a two-part aluminium cylinder having a diameter of 150 mm. and a length of 200 mm. The cylinder has a central 75 mm. bore and is fitted with 10 mm. end walls 2. In the bore is contained a heat exchange unit 3 and the calorimetric units 4. The aluminium cylinder is surrounded by a 20 mm. layer of polystyrene foam 5, and the entire construction is surrounded by a cylindrical stainless steel jacket 6 which is closed by a lid fitted with a ring gasket. The jacket rests horizontally on a support in a thermostated bath 7 which has a temperature fluctuation of about 0.005° C. Electrical leads and tubings for the calorimetric liquid are taken from the jacket and the bath through a 10 mm. steel tube (not shown).

As most of the commercial semi-conductor thermopiles are substantially quadrangular it is suitable in practice to give the above mentioned parts substantially square cross section to provide good connection to the thermopiles and efficiently exploit them.

The heat exchange unit 3 consists of gold tubes of 0.6 mm. inner diameter, which are coated with tin and embedded in a 75 mm. brass bolt. In the present construction the gold tubes are about 500 mm. long within the brass bolt. A constant thermopile signal was not affected by a 25° C. change in temperature of the water pumped into the calorimeter at a rate of 0.17 ml./min.

The calorimetric units 4 are of sandwich-type construction. The flow cell which has the external shape of a square plate is in good thermal contact with the thermopile plates positioned on either side of the cell. The thermopiles are of the commercially available type, for example from Thermoelectric Modulus 3951–1, Cambion, Cambridge, Mass. The electrical leads from the two pairs of thermopiles are connected in series. The external surfaces of the thermopile plates are in thermal contact with aluminium bolts (75 mm. in diameter and 25 mm. in thickness) acting as primary heat sinks. The calorimetric unit is joined together by three 6 mm. screwbolts.

During the experiments made in developing the present apparatus a great many flow cells of different design were tested. Part of the experience gained will be briefly referred to in the following. Here will be described that cell which was finally accepted for fast reactions and which was used for the tests described in the following.

The cell consists of a flat square metal plate including a T-piece 8 which leads to a channel system 9 milled out from the surface of the plate. The open channel is covered by a lid consisting of a 0.6 mm. plate, and the entire construction is sealed with an epoxy resin (Araldite AY103). Between the plate and its channel system and the lid there is positioned a 0.05 mm. 24 K gold foil acting as a gasket. The construction material for the plate and the lid is pure silver but all surfaces in contact with the calorimetric liquid are gold plated.

The two incoming streams of liquid are brought together in the gold T-piece positioned in a hole in the cell plate. A gold tube carries the liquid flow ot the channel where, in the mixing zone, it passes three contrictions 10 arranged to ensure complete mixing of the reactants. Each constriction is a plastic plug punctured to form a small hole. The inner dimension of the gold tubes is 0.6 mm. in the T-piece. The channel has square cross section with the dimension 1.5·1.5 mm., and the constriction holes are about 0.3 mm. in diameter.

An electrical calibration element 11 with a resistance of 30 ohm and made from insulated manganine wire is wound on the gold tube between the T-piece and the channel. The element is insulated by an air gap from the body of the flow cell and most of the heat evolved is thereby taken up by the liquid flow closest to the position where heat is evolved in a reaction experiment. For comparison purposes a second heating element is positioned at 12. This heating element is in good thermal contact with the body and the lid of the flow cell. With this cell design and the combined heat capacity of the thermopile, 15 minutes was required to reach a steady state at normal flow rates of about 1 to 1.5 ml. of each liquid component.

The liquid is pumped through the flow cell by means of peristaltic pumps. These pumps were found to give a very stable flow of constant rate. During a 48 hours pumping period the flow rate changed by only 0.1%.

In the present case where only aqueous solutions are investigated soft polyvinyl chloride tubings are used as connections between the pumps, the heat exchange unit, the flow cell and the collection vessel.

The differenital voltage from the thermopile in the two calorimetric units was amplified by a Keithley 150B Microvolt Ammeter. The amplified signal was recorded with a Sargent SR recorder. At low signal levels the chart readability was increased by the use of an integrator. For the electrical calibration use was made of a conventional electrical calibration circuit.

ELECTRICAL CALIBRATION EXPERIMENTS

Heat evolution at a calibration experiment and an analysis reaction must be closely comparable. It is therefore essential that the posiiton of the calibration element is such that a certain electrical heat effect will give rise to the same thermocouple signal as an identical heat effect from a reaction in the flow cell. The following series of experiments were undertaken to demonstrate the properties of the present calorimeter in this respect. Electrical calibrations were performed using the heating element 11 and the other heating element 12. The position of the heating element 11 is such that essentially all the heat evolved will be taken up by the liquid at a position where a substantial part of the heat will be evolved in a reaction experiment. Heat evolved in the heating element 12, however, will be directly transferred to the silver body of the flow cell and from there conducted out to various parts of the cell. Electrical heat effects were similar and flow rates were the same for the two series of experiments. The calibration constant $\epsilon$ is given in microcalories per second.

The results of these experiments are summarized in Table 1.

TABLE 1

Calibration constants $\epsilon$ determined with the regular heating element 11 and the element 12. Flow rate was 0.182 ml./min.

|  | Heat effect, μcal./sec. | $\epsilon$ | |
|---|---|---|---|
| Regular heating element 11 | 331.0 | 1.874 | |
|  | 331.2 | 1.875 | |
|  | 330.8 | 1.878 | |
|  | 330.9 | 1.877 | |
|  | 331.0 | 1.872 | |
|  | 330.6 | 1.878 | |
| Mean |  | 1.876 | +0.002 |
| Bedded heating element 12 | 259.6 | 1.884 | |
|  | 259.6 | 1.885 | |
|  | 259.4 | 1.885 | |
|  | 259.5 | 1.883 | |
|  | 259.6 | 1.882 | |
|  | 259.3 | 1.881 | |
| Mean |  | 1.883 | ±0.002 |

As is seen from the table there is only an insignificant difference (0.4%) in the calibration constants obtained with the two heating elements. It may thus be concluded that for the present calorimeter it is not very critical at what part of the mixing zone the heat is evolved and, therefore, the heating element position should be adequate. Further, it may be assumed that the $\epsilon$-value should not be sensitive to variations in rate of reaction or rate of mixing as long as the process takes place reasonably close to the calibration element, i.e. in the mixing zone of the flow cell.

From results of repeated calibration experiments it can be concluded that a heat effect measurement under suitable conditions can be made with a precision of 0.1% at a heat effect of 100 μcal./sec. (cf. Table 1) and 1% if the heat effect is in the order of 10 μcal./sec. A heat effect sensitivity value of 0.1 μcal./sec. was evaluated from the stability of the voltage-time curve. The stability of a steady state value during a 12 hour period was usually better than 1 μcal./sec.

Equation 4 requires that the calibration constant $\epsilon$ is a constant which is not affected by a variation in $W_p$. In a series of calibration experiments the electrical heat effect was varied whereas other experimental parameters were kept constant. Results are summarized in Table 2 from where it is seen that there is no systematic variation in the $\epsilon$-value with the heat effect. The standard deviation of the mean (±0.2%) is well within the expected amplification and recording errors.

TABLE 2

Calibraiton constant $\epsilon$ at different electrical heat effects. Total flow rate was 0.163 ml./min.

| Heat effect, μcal./sec.: | $\epsilon$ |
|---|---|
| 88.5 | 1.879 |
| 136.6 | 1.856 |
| 157.4 | 1.863 |
| 241.3 | 1.870 |
| 307.2 | 1.862 |
| 372.9 | 1.866 |
| Mean | 1.866 ±0.003 |

In FIG. 4 results are summarized from electrical calibration experiments performed with a constant electrical heat effect but with different flow rates. It is seen from the curve that the difference in calibration constant from zero flow rate to a normal flow rate (about 0.17 ml./min.) is less than 3%. At zero flow rate no heat is transported out from the cell by the liquid flow and $W=W_t$. From these results it may be concluded that under normal operation conditions 97% of heat evolved in the flow cell will pass through the thermopile.

ZERO EFFECTS

Heat effect generated by a process under steady state conditions is calculated through Equation 4, $W_p = \epsilon \cdot V_p$. Here $V_p$ is the displacement of the thermopile signal from a certain voltage base line to the recorded steady state value. The base line value will vary slightly with the experimental conditions and the following experiments were made to study these variations. The zero effect may be expressed in terms of a heat effect, $W'$ $$W' = \epsilon(V' - V_0) \tag{5}$$

where $V_0$ is the thermopile voltage under apparent equilibrium conditions for the calorimeter and when the flow rate was zero. $V'$ is the thermopile voltage (the "base line value") at the specified liquid flow. $V_0$ is usually not zero even after a very long equilibration time for the calorimeter. In the present case $V_0$ was about 1 μvolt.

In Equation 5, $\epsilon$ is assumed to be identical with the value determined at electrical calibration experiments although the correct $\epsilon$-value for this case might be slightly different.

In FIG. 4, $W'$ is given as a function of total flow rate. The flow was equal in both arms and the liquid was pure water. It is notable that the zero effect is increasingly negative at flow rates up to 0.5 ml./min. after which the curve will turn in a positive direction and the $W'$ value will be quite sensitive to variations in the flow rate.

VARIATION IN ZERO EFFECT WITH THE VISCOSITY OF THE CALORIMETRIC LIQUID

FIG. 5 shows the variation in the zero effect when at a constant flow rate the calorimetric liquid changes viscosity. Pure water and solutions containing different amounts of sucrose, respectively, were pumped through both of the arms with a total flow rate of 0.165 ml./min. The diagram shows that for this particular flow rate the base line value becomes less negative and then positive as the viscosity increases but that the change is small.

From FIGS. 4 and 5 it is evident that variation in zero effect with liquid flow rate and liquid viscosity should be considered when small heat effects are measured. The variation expressed as a heat effect, however, is very small and no significant systematic error will arise if the base line value is determined under conditions (flow rate, viscosity etc.) reasonably similar to those in the main experiment.

MIXING EFFICIENCY IN THE FLOW CELL

The mixing efficiency is of critical importance at a reaction or dilution experiment in flow calorimetry. At the development of the present apparatus several designs of mixing cells were tested and found to be inadequate at experiments where a complete mixing was required.

As a sensitive test for the mixing efficiency "titration curves" for HCl—NaOH solutions were determined. Through one of the arms in the flow cell NaOH solutions of different concentrations were pumped whereas the concentration of the HCl solution through the other arm was kept constant (0.005 or 0.01 M). Changes in heat effect from dilution and mixing of ionic species can be neglected in the investigated concentration ranges. Ideally one would expect a constant heat effect value as long as NaOH is in excess and from the equivalence point the heat effect should decrease linearly to zero as the NaOH concentration approaches zero. Within limits of error the ideal "titration curve" was obtained with the final cell construction.

Figure 2:
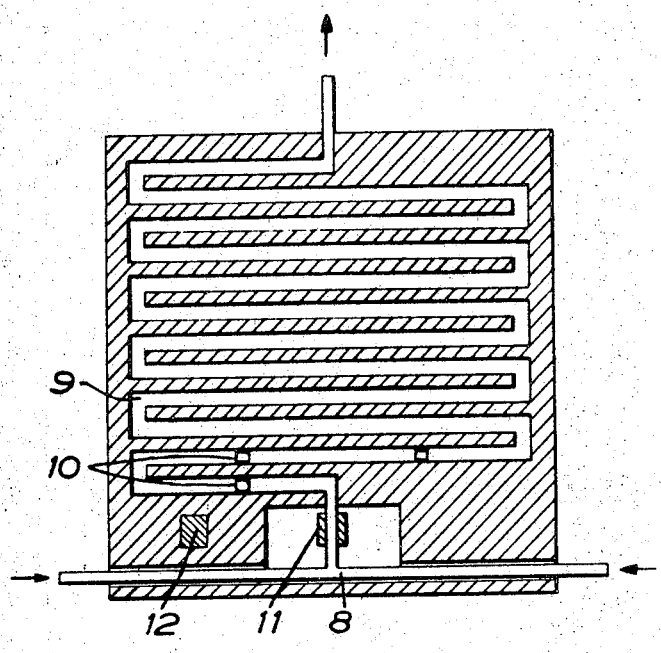
FIG. 2 is a plan view of the measuring cell.

The first cell investigated has a gold T-piece and a heating element applied as in the final design, FIG. 2. The combined flow was taken through a straight gold tube (0.6 mm. inner diametre) bedded by Woods metal in a copper plate which formed the body of the cell. Mixing in this cell was very poor. In a titration experiment the heat effect did not approach a constant value until the calculated equivalence point had been exceeded by more than a ten fold excess of NaOH.

In another construction a 0.08 ml. mixing reservoir was inserted between the T-piece and the gold tube bedded in the copper plate. The mixing efficiency was increased but not sufficiently as shown by the fact that there was required a twofold excess of NaOH to reach the horizontal part of the titration curve. The design of this cell was modified in different ways e.g. inserting constrictions in the mixing reservoir. These changes resulted in an improved performance which, however, was not very dependable. It was shown that air bubbles entering the flow system were easily trapped in the reservoir and caused a decrease in the mixing efficiency.

Model studies which led to the final design of the present flow cell showed that for water at room temperature cross section of tubes or channels used in the cell should preferably be 1.5 mm. if air bubbles should not be trapped.

HEATS OF DILUTION OF UREA AND SUCROSE

The neutralization experiments referred to above are not suitable as accurate tests for the absolute value of the heat effect measured with the calorimeter. For that purpose it would be necessary to take rigorous and experimentally difficult precautions to avoid $CO_2$ interference.

More convenient test reactions for a check of the absolute value are provided by dilution experiments involving e.g. urea and sucrose. One may note, however, that a successive heat of dilution of a compound usually will result in smaller and smaller heat effects. One can therefore expect to obtain an essentially correct heat of dilution value even if the mixing has not been quite perfect. For one of the earlier flow cells tested during the preliminary work good heat of dilution values were obtained for urea although it was shown by acid base titration experiments that mixing was not adequate.

Urea solutions suitable for dilution experiments with the present calorimeter can be rather dilute and have a low viscosity. They are therefore comparatively easily mixed with water in the flow cell. Sucrose forms a nearly perfect aqueous solution and heats of dilution are therefore very small. In order to get a reasonable heat effect in a dilution experiment it is necessary to use rather concentrated solutions. Such solutions are quite viscous and are not very easily mixed with water in the flow cell without the use of a mechanical stirrer or a similar device. Experiments with another flow cell resulted in very low values for dilution of a 1 molal sugar solution with an equal volume of water (55% of the calculated value). In Tables 3 and 4 results are summarized from dilution experiments with urea and sucrose solutions using the final design of flow cell.

TABLE 3

Heat of dilution of aqueous urea solutions at 25.00° C.

| Molality | | Heat effect, $\mu$cal./sec. | $+\Delta H$, cal./mole | | $\dfrac{\Delta H_{exp.}}{\Delta H_{Calc.}} \cdot 100$ |
|---|---|---|---|---|---|
| Initial | Final | | Experimental | Calculated | |
| .916 | .447 | 40.38 | 36.54 | 36.34 | 100.6 |
| 1.053 | .512 | 52.16 | 41.31 | 41.28 | 100.1 |
| 1.279 | .619 | 74.68 | 49.16 | 49.10 | 100.1 |
| 1.456 | .700 | 94.29 | 55.28 | 55.15 | 100.2 |
| 1.659 | .806 | 119.49 | 61.60 | 60.78 | 101.3 |
| 1.957 | .933 | 158.70 | 70.25 | 70.64 | 99.4 |

TABLE 4

Heat of dilutions of aqueous surcose solutions at 25.00° C.

| Molality | | Heat effect, $\mu$cal./sec. | $-\Delta H$, cal./mole | | $\dfrac{\Delta H_{exp.}}{\Delta H_{Calc.}} \cdot 100$ |
|---|---|---|---|---|---|
| Initial | Final | | Experimental | Calculated | |
| .516 | .250 | 22.45 | 34.49 | 34.37 | 100.3 |
| .731 | .347 | 43.22 | 48.81 | 48.77 | 100.1 |
| .752 | .375 | 41.45 | 47.40 | 47.75 | 99.3 |
| 1.252 | .598 | 106.42 | 79.70 | 79.50 | 100.3 |

The obtained heat of dilution values were compared with data calculated from the expressions given by Gucker et at. for the apparent heat content of urea[9] and surcose[10] in aqueous solution. All experiments were am de at 25.00° C.

From the tables it is seen that in all cases there is a good agreement between determined and calculated values. The differences, usually less than 1%, are judged to be well within the limits of uncertainty of the experiments.

The measuring cell described above can also be used to advantage for analysing liquids to which no reaction component is to be added. In this case for instance the two connections of the T-piece can be connected via their pumps to the reservoir containing the liquid to be analysed.

As already mentioned in the foregoing the dimension of the channels in the measuring cell are depend to a certain extent upon the viscosity of the liquids being measured, but as has also been mentioned in connection with investigations of surcose solutions, relatively viscous solutions can be studied to advantage in the described cell.

It should also be pointed out once more that when no mixing of the reaction components shall take place, the channel may extend straight through the measuring cell without any extension of the flow path.

To further show what possibilities have now been opened up by the new flow calorimeters, reference is made to FIG. 6 which shows the life cycle for the bacterium *Escherichia coli* in a nutritive consisting of Difco. As is seen from the curve several great changes (heat quantity in microcalories) occur. For instance, it can be seen from the curve that displacements take place chemically, that the nutritive has been consumed, that certain effects are obtained with additions of antibiotics. The information conveyed actually is very ample, and bacteriologists now have the opportunity of better exploring what happens in the solutions.

A corresponding turbidimetric measurement gives a curve of a more uniform kind. Chemical charges do not appear from this curve, since such changes can very well happen without any change of turbidity. It cannot either be indicated when the life cycle ceases. Moreover, the measurements cannot be extended in time in the manner desired because there is soon attained a maximum value for the turbidity.

What we claim and desire to secure by Letters Patent is:

1. In a system for monitoring chemical and physical processes in a liquid in a least one component system by means of calorimetric measurements of reaction heat by electrical means in a heat balanced calorimetric system, the improvement comprising the steps of flowing said liquid through a heat exchanger arranged in heat equilibrium with a pair of thermopiles, flowing the heat-equalized liquid from said heat exchanger through an elongated channel in a measuring cell arranged in thermal contact with one of said thermopiles, and measuring the voltages charges due to said chemical and physical processes as said liquid passes through said cell.

2. A method as claimed in claim 1, comprising the further steps of combining liquids from at least two systems, and flowing the combined liquids to the measuring point in said measuring cell through an elongtaed channel to facilitate mixing.

3. A method as claimed in claim 2, wherein the combined liquids are caused to flow through a zigzag channel.

4. A method as claimed in claim 2, wherein the mixture in the elongated channel is caused to flow past one or more constrictions to further facilitate mixing.

5. A method as claimed in 1, wherein said liquids are pumped at a constant flow rate through the measuring point by means of peristaltic pumps.

6. A method as claimed in claim 1, wherein the liquid to be monitored is fed dropwise to the measuring point.

7. A method as claimed in claim 1, further comprising the steps of dropwise feeding a plurality of liquids having different composition to said measuring point.

8. In a microcalorimetric analyzing apparatus for analyzing chemical and physical processes in liquids, said apparatus including a pair of thermopiles and a measuring cell arranged in a calorimetric block for heat equilibrium, and an electrical reading instrument connected to said thermopiles for registering temperature changes in the measuring cell, the improvement comprising, a heat exchanger mounted in said block and having an inlet and an outlet, pump means connected to said inlet and operable to pump said liquids through said heat exchanger to equalize the temperature of said liquids and said block, a through-going channel formed in said measuring cell, a conduit connecting said outlet of said heat exchanger to the inlet of said channel, said channel having an outlet end connected to a discharge conduit leading to the outside of said block, and means supporting one of said thermopiles in thermal contact with said measuring cell, said thermopiles being connected in series to said reading instrument and said pump being operable to pump said liquids through said heat exchanger, said conduit and said measuring cell.

9. An apparatus as claimed in claim 8, wherein said measuring cell is in the form of a flat thin body, said channel being formed in one surface thereof, and a plate covering said channel and said one surface of said body.

10. An apparatus as claimed in claim 9, wherein said channel extends straight from one side edge of said body to an opposite side edge thereof.

11. An apparatus as claimed in claim 9, wherein said channel describes a curving path to and fro over said one surface.

12. An apparatus as claimed in claim 8, wherein said channel has its inlet connected to two supply lines by means of a T-piece.

13. An apparatus as claimed in claim 8, further comprising at least one constriction positioned in said channel to facilitate mixing of liquid flowing therethrough.

14. An apparatus as claimed in claim 8, wherein said channel has a substantially rectangular cross section.

15. An apparatus as claimed in claim 8, wherein the channel has a cross sectional area of about 2.3 sq. mm.

16. An apparatus as claimed in claim 8, wherein the measuring cell is formed of chemically inert materials of good heat conductivity.

17. An apparatus as claimed in claim 8, wherein said pump means comprises at least one peristaltic pump.

18. An apparatus as claimed in claim 17, wherein said at least one peristaltic pump is operable intermittently to extend the time of stay of the liquid in the cell.

References Cited

UNITED STATES PATENTS

| | | | |
|---|---|---|---|
| 3,059,471 | 10/1962 | Calvet | 73—190 |
| 3,211,531 | 10/1965 | Benzinger | 73—190X |
| 3,273,968 | 9/1966 | Benzinger | 73—190X |
| 3,298,790 | 1/1967 | Benzinger | 73—190X |

LOUIS R. PRINCE, Primary Examiner

J. W. ROSKOS, Assistant Examiner

U.S. Cl. X.R.

73—53